United States Patent [19]

Cruver

[11] Patent Number: 5,094,585
[45] Date of Patent: Mar. 10, 1992

[54] MECHANISM FOR STACKING FLAT ARTICLES

[75] Inventor: Michael Cruver, Port Townsend, Wash.

[73] Assignee: Formost Packaging Machines, Inc., Woodinville, Wash.

[21] Appl. No.: 563,635

[22] Filed: Aug. 7, 1990

[51] Int. Cl.⁵ .............................................. B65G 57/11
[52] U.S. Cl. ................................ 414/790.3; 198/726; 414/789; 414/794.4
[58] Field of Search ............... 198/726, 624; 414/786, 414/789, 790.3, 794.4

[56] References Cited

U.S. PATENT DOCUMENTS

| | | |
|---|---|---|
| 2,919,789 | 1/1960 | Coakley . |
| 3,675,387 | 7/1972 | Lekan ..................................... 53/157 |
| 3,683,758 | 8/1972 | Feldkamper ..................... 93/93 DP |
| 3,810,554 | 5/1974 | London et al. . |
| 3,812,647 | 5/1974 | Bertling et al. .............. 414/790.3 X |
| 3,952,478 | 4/1976 | Richards et al. ...................... 53/122 |
| 3,998,141 | 12/1976 | Hsiue ........................... 414/790.3 X |
| 4,034,846 | 7/1977 | Burgis et al. ......................... 198/422 |
| 4,137,604 | 2/1979 | Sandberg et al. ........................ 17/32 |
| 4,518,300 | 5/1985 | Kent ................................... 414/790.3 |
| 4,736,571 | 4/1988 | Bucolt ......................... 414/790.3 X |

Primary Examiner—Robert J. Spar
Assistant Examiner—Janice Krizek
Attorney, Agent, or Firm—Robert W. Beach

[57] ABSTRACT

Stacking mechanism includes an accelerating conveyor for launching flat articles edgewise toward a stacking station, a continuously moving conveyor for moving stacks of articles away from the stacking station, two intermittently rotatable rotors and a stationary plate therebetween forming the stacking station, the rotors each having for pegs upstanding from their margins in orthogonal relationship so that a peg of each rotor will engage a stack of articles at the stacking station simultaneously and push the stack from the stacking station onto the discharge conveyor.

6 Claims, 2 Drawing Sheets

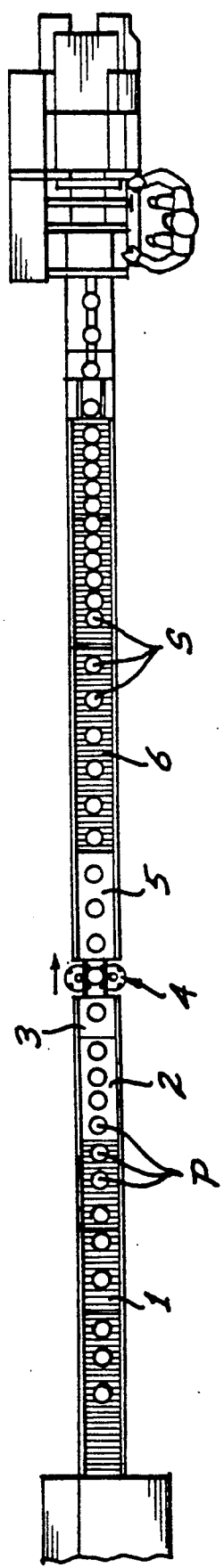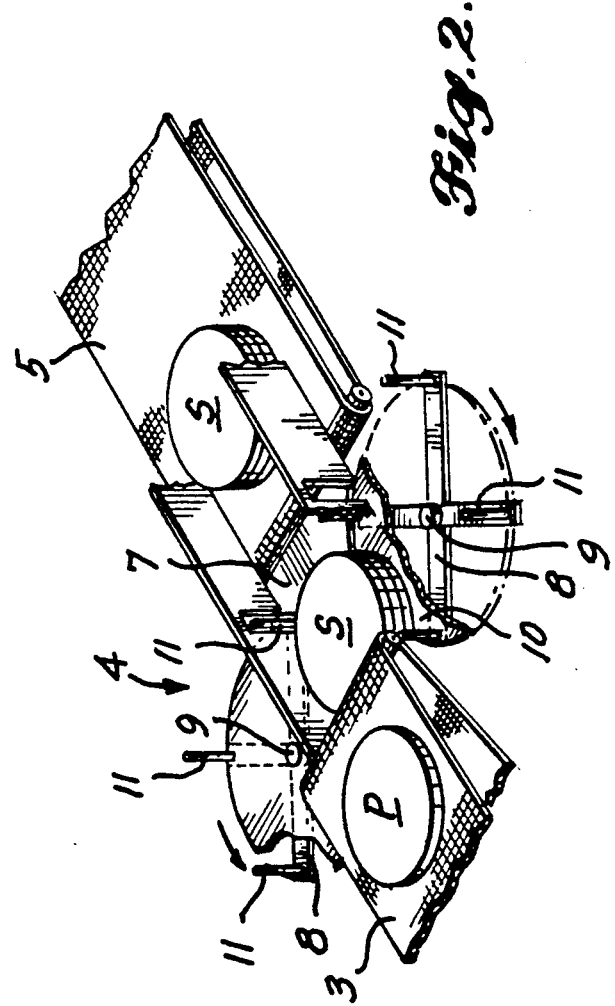

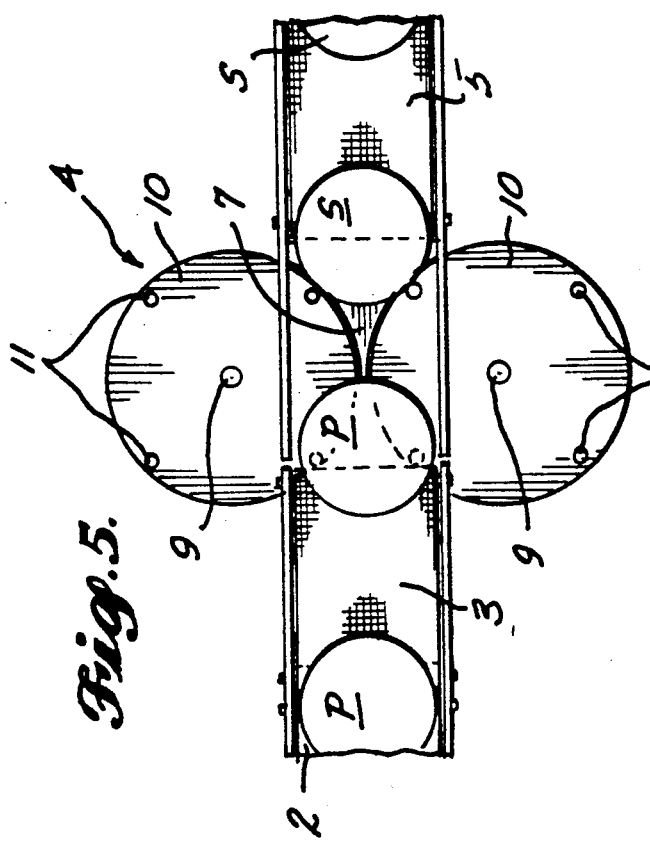
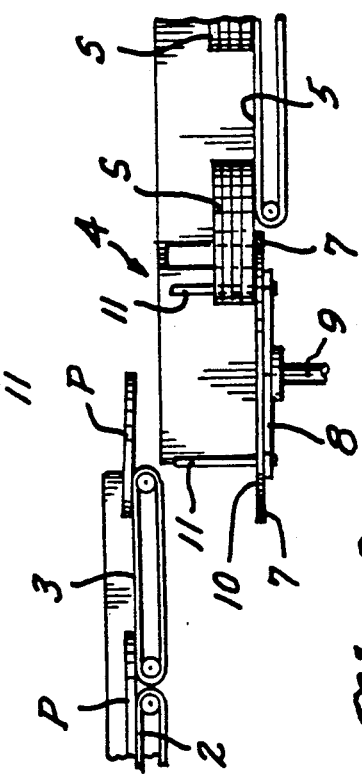
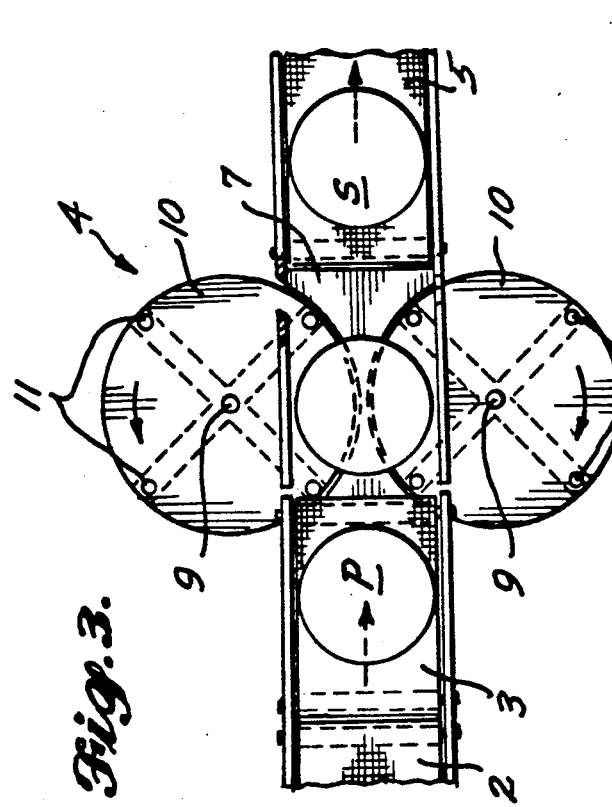
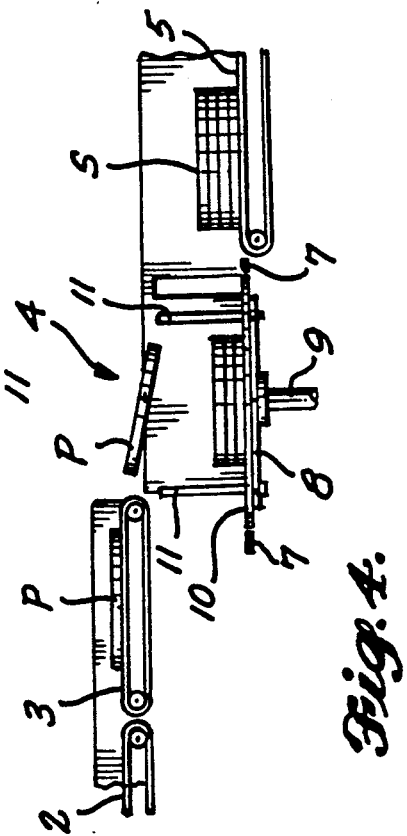

MECHANISM FOR STACKING FLAT ARTICLES

BACKGROUND OF THE INVENTION

1. Field of the Invention

This invention relates to mechanism for forming a stack of flat articles and for subsequently handling such article stack.

2. Problem

In stacking flat articles such as frozen pancakes, frozen French toast slices, frozen waffles or hamburger patties, for example, for packaging or processing in a stack, it is desirable to stack such articles quickly and to handle the formed stacks expeditiously by mechanism which is of simple construction and which can be operated efficiently.

3. Prior Art

While the Burgis et al. U.S. Pat. No. 4,034,846, issued July 12, 1977, shows apparatus for stacking flat articles, such apparatus requires that the articles be of magnetic material such as automotive baffles or hydropans, as stated at column 2, line 10, and column 3, line 15. The stacking mechanism of this patent does not provide for continual movement of the conveyors for moving the articles into the stacking mechanism or out of the stacking mechanism but requires that both the infeed conveyor and the outfeed conveyor be stopped intermittently while carrying a considerable number of articles.

The stacking mechanism shown in the Feldkamper U.S. Pat. No. 3,683,758, issued Aug. 15, 1972, shows mechanism for stacking flattened paper bags or sacks (column 2, lines 29 and 30, and column 3, lines 64 and 65) supplied to the stacking equipment in an overlapping or scaled or shingled formation (column 5, lines 14 to 17, and FIGS. 1,2 and 4). The supply conveyor is driven at a higher speed to pull a counted stack of bags from the preceding bags (column 7, lines 25 to 33) and is driven at a lower speed to move the counted bags into the stacking station (column 7, lines 40 to 42 and 49 to 62). The bags are evened in the stack by striking a wall (column 7, lines 60 to 62) which wall is swung upward out of the way of the stack when the stack is to be removed from the stacking magazine (column 5, line 61, to column 6, line 2). The stack of bags is accumulated on the conveyor belt (column 5, lines 60 and 61), as indicated in FIG. 1, the feed conveyor essentially feeds a shingled stack of flat bags into and against a wall of a stacking magazine which evens up the bags in the stack.

The Coakley U.S. Pat. No. 2,919,789, issued Jan. 5, 1960, shows an apparatus for stacking paper bag tubes that again are arranged initially in shingle fashion, as shown in FIGS. 2 and 3, and again are stacked on the upper stretch 7a of a belt 7. The shingled stack is fed by belt 5a onto the belt 7 and, after the stack has accumulated on this belt, its movement is started to feed the stack onto a table, as described at column 3, lines 38 to 45.

In Richards et al. U.S. Pat. No. 3,952,478, issued Apr. 27, 1976, and Sandberg et al. U.S. Pat. No. 4,137,604, issued Feb. 6, 1979, stacks of flat articles again are accumulated on a belt while it is stopped and, after the stack has accumulated, the belt is started again. The mechanism shown in these patents for placing the articles on the belts is different from that disclosed in the other patents discussed above.

The Lekan U.S. Pat. No. 3,675,387, issued July 11, 1972, and the London et al. U.S. Pat. No. 3,810,554, issued May 14, 1974, show stacking mechanism for forming stacks on stationary surfaces and no mechanism is shown for removing the stacks from such surfaces. The stacking mechanism of the Lekan patent is similar to the stacking mechanism shown in the Richards et al. U.S. Pat. No. 3,952,478 discussed above.

SUMMARY OF THE INVENTION

It is a principal object of the present invention to be able to stack flat articles which may not be of magnetic material quickly and accurately and to handle a stack expeditiously after it has been formed so that a continuous row of stacks can be discharged from the stacker.

A particular object is to be able to form stacks of flat articles quickly and to remove the stack quickly without interference with unstacked articles being fed to the stacker or stacks of articles being removed from the stacker.

Another object is to provide stacker mechanism which does not require gates to confine a stack.

The foregoing objects can be accomplished by stacking mechanism including an accelerating belt conveyor for launching edgewise flat articles to be stacked in a stacking station and to remove a stack of articles from such stacking station by local transfer mechanism onto a continually moving discharge conveyor.

BRIEF DESCRIPTION OF THE DRAWINGS

FIG. 1 is a plan of apparatus for conveying and handling flat articles to be stacked and which includes the stacker of the present invention with mechanism for discharging stacks of articles from the stacker.

FIG. 2 is a top perspective of the stacker mechanism of the present invention.

FIG. 3 is a top plan, and FIG. 4 is a side elevation with parts broken away of the stacker mechanism of the present invention illustrating one aspect of the stacker.

FIG. 5 is a plan corresponding to FIG. 3, and FIG. 6 is a side elevation with parts broken away corresponding to FIG. 4, illustrating a different operating sequence of the stacker.

DETAILED DESCRIPTION

FIG. 1 shows a representative environment in which the stacker of the present invention can be used. Flat pieces P which may be slices of French toast, pancakes or waffles, preferably in frozen condition, are supplied by a supply conveyor 1 to a metering conveyor 2. The metering conveyor is arranged to carry a predetermined number of pieces P to be stacked, four such pieces being shown in FIG. 1.

The metering conveyor 2 feeds the pieces P one at a time onto an accelerating conveyor 3 which launches the pieces P edgewise into the stacker 4.

The stacks S of pieces are removed from the stacker by continuously moving discharge conveyor 5 which may discharge the stacks onto an outfeed roller conveyor 6 leading to a packaging station, for example.

The stacker of the present invention embodies the accelerating infeed belt 3 which carries unstacked flat pieces P, the discharge conveyor 5 which discharges stacks S from the stacker and the local stack transfer mechanism incorporated in the stacker 4 which transfers stacks formed in the stacker to the discharge belt 5 while it is in motion.

The stacking station includes a stationary plate 7 arranged substantially coplanar with the upper stretch of discharge belt 5 and located between the acceleration belt 3 and the discharge belt. At each side of the stationary plate 7 is a transfer rotor including a base such as crossbars 8 arranged perpendicularly and mounted by a shaft 9 for rotation about a vertical axis. The crossbars 8 carry circular or rotor plates 10 that are arranged coplanar with the stationary plate 7 which cooperatively support at least a substantial portion of the weight of a stack of pieces. The opposite edges of the stationary plate are arcuately concave complemental to the circumferences of the rotor plates 10 so that such stationary plate and the adjacent portions of the rotor plates form a stack-supporting surface bridging between the infeed conveyor and the discharge conveyor 5 and define a stacking station.

The rotors have pegs 11 upstanding from the margins of plates 10, four being shown disposed in orthogonal relationship but a different number of pegs, such as 3 or 5, could be used. The rotors are connected together for conjoint rotation in opposite directions as indicated by the arrows in FIGS. 2 and 3 and are driven intermittently by drive mechanism not shown which may be an intermittently operated servo motor that will rotate the rotors simultaneously through a quarter turn.

As shown in FIGS. 2, 3 and 5, the pegs are located with respect to the size of the pieces P arranged in a stack so that pegs of both rotors acting in unison will be moved from the position shown in FIG. 3 to the position shown in FIG. 5 and during such movement will transfer a stack of flat articles from the stacking station stack-receiving surface onto the continuously moving discharge belt 5.

In operation, the accelerating infeed conveyor 3 will launch individual pieces P from the position shown in FIG. 4 to fall onto the composite stack-receiving surface of plate 7 and the adjacent portions of disks 10. When a stack of a desired number of pieces has accumulated, such as four as shown in FIGS. 4 and 6, the rotors will be energized to rotate in opposite directions so that a peg 11 of each rotor will engage the rearward edge of the stack simultaneously and slide it forward from the stacking station over the stationary plate 7 onto the discharge conveyor 5, as indicated in FIG. 6. The moving discharge conveyor 5 will then carry the stack away to the subsequent conveyor 6 or other processing apparatus.

It will be noted that to minimize the delay in stacking procedure, as soon as the rotors have made a complete quarter turn to transfer the stack out of the stacking station on the stack-receiving surface, as shown in FIGS. 5 and 6, the next piece P is being fed by the accelerating conveyor 3 into the stacking station. To expedite the stacking procedure, it is therefore very desirable for the stack transfer rotors to be rotated quickly. Such operation can be accomplished because the rotors are small and light and, consequently, have little inertia to stop and to start in contrast to the problem of starting and stopping a discharge conveyor 5, particularly when loaded with stacks of articles.

I claim:

1. Mechanism for stacking flat articles including supply conveyor means, a stacking station, acceleration conveyor means located between the supply conveyor means and the stacking station for accelerating an article edgewise to launch it edgewise toward the stacking station in a trajectory, discharge conveyor means at the side of the stacking station opposite the acceleration conveyor means and transfer means at the stacking station for transferring a stack of flat articles from the stacking station onto the discharge conveyor means while the discharge conveyor means is moving, the improvement comprising the transfer means including a pair of stack-supporting rotor plates rotatable about upright axes in opposite directions for cooperatively supporting at least a substantial portion of the weight of the stacked articles during transfer of the stacked articles from the stacking station onto the moving discharge conveyor means.

2. The mechanism defined in claim 1, in which each stack-supporting rotor plate carries pusher means engageable with a stack of articles supported by the stack-supporting rotor plates to push the stack of articles from the stack-supporting rotor plates onto the moving discharge conveyor means.

3. The mechanism defined in claim 2, in which the pusher means includes pegs upstanding from the stack-supporting rotor plates.

4. The mechanism defined in claim 3, in which each of the stack-supporting rotor plates carries four pegs upstanding from the marginal portion of the stack-supporting rotor plate in orthogonal relationship.

5. The mechanism defined in claim 1, in which the stacking station includes a stationary plate located between the acceleration conveyor and the discharge conveyor, and the stack-supporting rotor plates are located respectively on opposite sides of said stationary plate.

6. The mechanism defined in claim 5, in which the stack-supporting rotor plates are circular and have upper surfaces disposed coplanar with the upper surface of the stationary plate and the opposite edges of the stationary plate are concave complemental to the circumferences of the stack-supporting rotor plates.

* * * * *

UNITED STATES PATENT AND TRADEMARK OFFICE
CERTIFICATE OF CORRECTION

PATENT NO. : 5,094,585

DATED : March 10, 1992

INVENTOR(S) : Michael CRUVER

It is certified that error appears in the above-identified patent and that said Letters Patent is hereby corrected as shown below:

ON THE TITLE PAGE:

Item [57] ABSTRACT: line 7 of the ABSTRACT, cancel "for" and insert --four--.

Signed and Sealed this

Fifth Day of October, 1993

*Attest:*

BRUCE LEHMAN

*Attesting Officer*   Commissioner of Patents and Trademarks